United States Patent [19]

Tomma

[11] 3,949,948

[45] Apr. 13, 1976

[54] DEVICE FOR WEB CUTTING

[75] Inventor: Kauko Tomma, Helsinki, Finland

[73] Assignee: Oy Wartsila AB, Helsinki, Finland

[22] Filed: Dec. 27, 1974

[21] Appl. No.: 536,891

[30] Foreign Application Priority Data

Jan. 4, 1974 Finland............................. 3474/74

[52] U.S. Cl. ................. 242/56.2; 242/56.9; 242/65
[51] Int. Cl.² ........................................ B65H 35/02
[58] Field of Search...................... 242/56.2, 56.9, 65

[56] References Cited
UNITED STATES PATENTS

| | | |
|---|---|---|
| 2,985,398 | 5/1961 | Rockstrom............................ 242/65 |
| 3,086,726 | 4/1963 | Aaron................................... 242/65 |
| 3,122,335 | 2/1964 | Dusenberg.......................... 242/56.2 |
| 3,188,016 | 6/1965 | Aaron................................... 242/65 |
| 3,750,973 | 8/1973 | Walters............................... 242/56.2 |

*Primary Examiner*—Edward J. McCarthy
*Attorney, Agent, or Firm*—Haseltine, Lake & Waters

[57] ABSTRACT

A device for cutting a web into a plurality of longitudinal sections, comprising slitters, a center drum and supporting arms for rewind rolls formed of adjacent slitted web sections and located at opposite sides of the center drum. The arms are attached to sliding carriages movable along guide beams in a cross-web direction and the slitters are attached to the sliding carriages and move with them when the slitting width is set, so that the slitters and the supporting arms are automatically correctly positioned with respect to each other in a cross-web direction. The supporting arms are journalled at the rolls and at the sliding carriages and are free to move away from the center drum without affecting the position of the sliding carriages which are kept stationary during cutting and rewinding operations.

2 Claims, 1 Drawing Figure

U.S. Patent   April 13, 1976   3,949,948
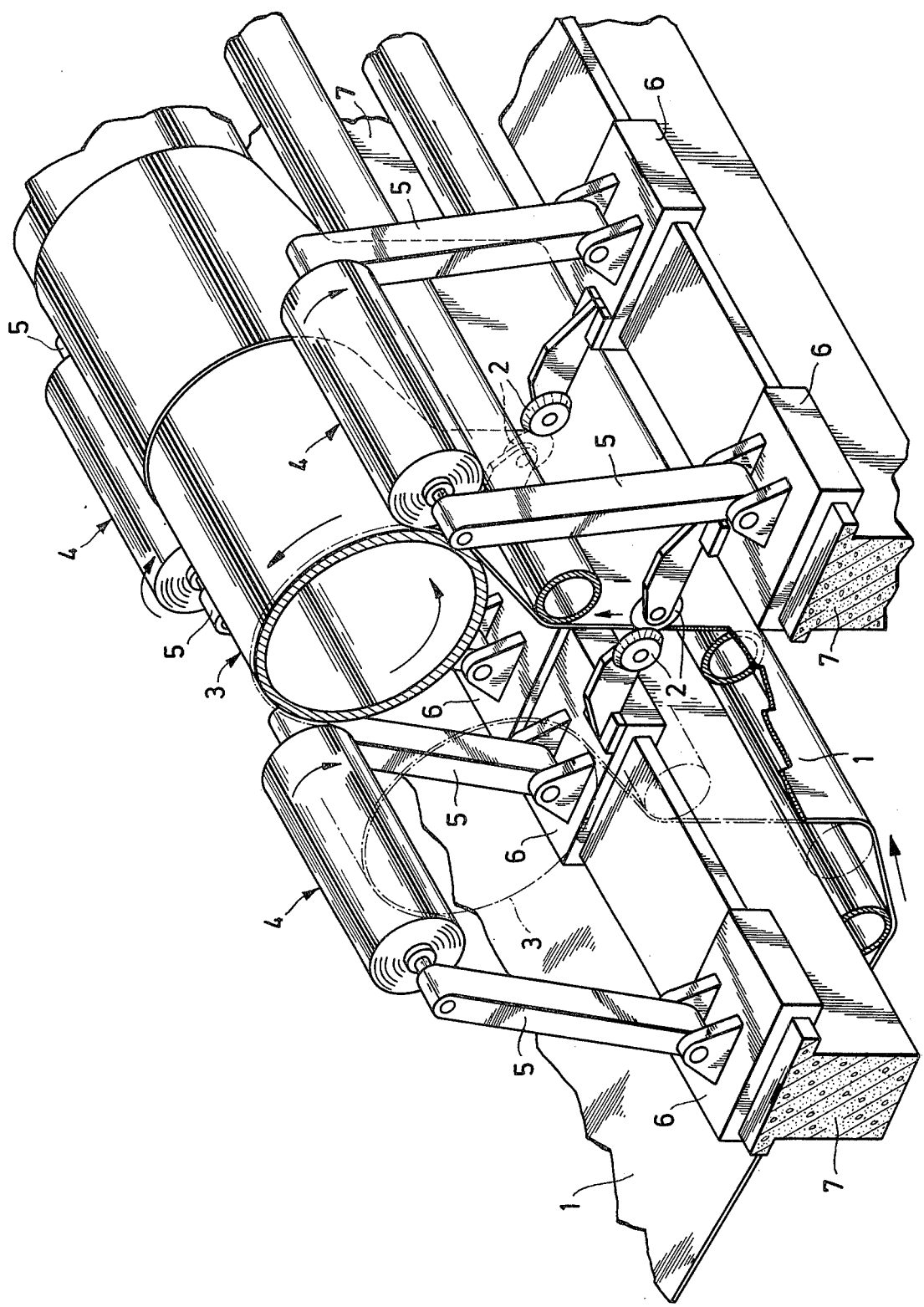

DEVICE FOR WEB CUTTING

The invention relates to a device for cutting a web, for instance, a paper or board web, which device comprises slitters, a center drum, and supporting arms for rewind rolls formed of adjacent slitted web sections and located at opposite sides of the center drum, which arms are attached to sliding carriages, movable along guide beams in a cross-machine direction.

In known solutions, the slitters and the rewind roll supporting chucks are attached to separate constructional parts and thus they both require individual setting. One reason for this has been that when winding new rolls, their diameter grows and at the same time the axis of the roll moves away from the center drum whereby also the sliding carriages have moved away from the center drum because the rolls have been stationary with respect to the sliding carriages.

The object of the invention is to eliminate disadvantages mentioned. The invention is characterized in the combination of having the slitters attached to the sliding carriages so that the setting of the slitting width is accomplished by moving the carriages, and consequently, the supporting arms are automatically correctly positioned in the cross-machine direction, and that the supporting arms are journalled in the rolls and in the sliding carriages in such a way that the rolls can move away from the center drum without affecting the position of the sliding carriages. When a device according to the invention is set for forming rolls of a desired width, both the supporting arms and the slitters are adjusted simultaneously by means of moving the sliding carriages. Thus a shorter setting time than in previously known constructions is obtained when changing the width of the rewind rolls.

In the following, the invention is described more in detail with reference to the accompanying drawing the single FIGURE of which shows an embodiment of a device according to the invention.

In the drawing, 1 indicates a web to be cut, 2 slitters cutting the web, 3 a center drum, 4 rewind rolls to be formed of sections cut from the web and 5 supporting arms for the rolls attached to sliding carriages 6 movable along guide beams 7.

The device shown in the drawing functions as follows: The device is set to cut the web into sections of desired width by moving the sliding carriages 6 along the guide beams 7 located on both sides of the center drum 3, so that the slitters 2 attached to the sliding carriages are located in front of each other to form pairs of slitters a desired distances from each other. Simultaneously, the supporting arms 5 of the rewind rolls, which arms are attached to the sliding carriages, are automatically brought into right positions.

In the shown embodiment, the web 1 to be cut, is led from the unwind roll to the rewind rolls 4 under one of the guide beams and up between the beams where the slitters 2 cutting the web 1 are located. The adjacent sections of the cut web are wound, for instance, by means of surface driven winding on opposite sides of the center drum 3. As the rewind rolls 4 grow, the supporting arms 5 of the rolls move along in correspondance with the axes of the rolls away from the center drum. The supporting arms 5, however, are journalled to the sliding carriage 6 so that the said movement does not affect the position of the carriage which makes it possible to have the slitters 2 attached to the carriages 6.

The invention is not limited to the embodiment shown, but several variations are feasible within the scope of the following claim.

I claim:

1. A device for cutting a web into a plurality of longitudinal sections, said device comprising slitters, a center drum and supporting arms for rewind rolls formed of adjacent slitted web sections and located at opposite sides of said center drum, said arms being attached to sliding carriages movable along guide beams in a cross-web direction, said slitters being attached to said sliding carriages so as to move with them when setting the slitting width, whereby said slitters and said supporting arms are automatically correctly positioned with respect to each other in a cross-web direction, said supporting arms being journalled at said rewind rolls and at said sliding carriages and being free to move away from said center drum while said sliding carriages are stationary.

2. A device as defined in claim 1 wherein said slitters and said supporting arms are carried by the same sliding carriages and move with them when setting the slitting width whereby the setting time is substantially reduced when changing the width of the rewind rolls.

* * * * *